US010706005B2

(12) United States Patent
Wei et al.

(10) Patent No.: US 10,706,005 B2
(45) Date of Patent: Jul. 7, 2020

(54) FILE SYSTEM INTERFACE FOR REMOTE DIRECT MEMORY ACCESS

(71) Applicant: VMware, Inc., Palo Alto, CA (US)

(72) Inventors: Michael Wei, Palo Alto, CA (US); Marcos Aguilera, Mountain View, CA (US); Irina Calciu, Palo Alto, CA (US); Stanko Novakovic, Mountain View, CA (US); Lalith Suresh, Mountain View, CA (US); Jayneel Gandhi, Sunnyvale, CA (US); Nadav Amit, Mountain View, CA (US); Pratap Subrahmanyam, Saratoga, CA (US); Xavier Deguillard, Mountain View, CA (US); Kiran Tati, Fremont, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 292 days.

(21) Appl. No.: 15/836,577

(22) Filed: Dec. 8, 2017

(65) Prior Publication Data

US 2019/0179794 A1     Jun. 13, 2019

(51) Int. Cl.
*G06F 15/173*     (2006.01)
*G06F 16/182*     (2019.01)

(52) U.S. Cl.
CPC ...... *G06F 15/17331* (2013.01); *G06F 16/183* (2019.01)

(58) Field of Classification Search
CPC .......................... G06F 15/17331; G06F 16/183
(Continued)

(56) References Cited

U.S. PATENT DOCUMENTS

| 6,073,130 A | * | 6/2000 | Jacobson | ............ G06F 16/24578 |
| 8,527,661 B1 | * | 9/2013 | Lee | ..................... H04L 67/1097 709/217 |

(Continued)

FOREIGN PATENT DOCUMENTS

WO    WO-2018120988 A1 *   7/2018    ............... G06F 8/60

OTHER PUBLICATIONS

N. S. Islam et al., High Performance RDMA-based Design of HDFS over InfiniBand, IEEE 2012, SC12, Nov. 10-16, 2012, Salt Lake City, Utah, USA, 12 pages.

*Primary Examiner* — David P Zarka
(74) *Attorney, Agent, or Firm* — Fish & Richardson P.C.

(57) ABSTRACT

Exemplary methods, apparatuses, and systems include a distributed memory agent within a first node intercepting an operating system request to open a file from an application running on the first node. The request includes a file identifier, which the distributed memory agent transmits to a remote memory manager. The distributed memory agent receives, from the remote memory manager, a memory location within a second node for the file identifier and information to establish a remote direct memory access channel between the first node and the second node. In response to the request to open the file, the distributed memory agent establishes the remote direct memory access channel between the first node and the second node. The remote direct memory access channel allows the first node to read directly from or write directly to the memory location within the second node while bypassing an operating system of the second node.

14 Claims, 3 Drawing Sheets

(58) Field of Classification Search
USPC .......................................................... 709/212
See application file for complete search history.

(56) References Cited

U.S. PATENT DOCUMENTS

| | | | | |
|---|---|---|---|---|
| 2003/0154221 | A1* | 8/2003 | Caronni | G06F 16/148 707/205 |
| 2005/0114592 | A1* | 5/2005 | Jin | G06F 3/0611 711/113 |
| 2006/0101092 | A1* | 5/2006 | Ishida | G06F 8/71 |
| 2006/0179185 | A1* | 8/2006 | Daly, Jr. | G06F 12/0815 710/39 |
| 2008/0104315 | A1* | 5/2008 | Hall | G06F 3/0613 711/112 |
| 2008/0320376 | A1* | 12/2008 | Unno | G06F 11/073 714/819 |
| 2011/0264635 | A1* | 10/2011 | Yang | G06F 16/10 707/695 |
| 2012/0260021 | A1* | 10/2012 | Rudelic | G06F 3/0641 711/103 |
| 2013/0290967 | A1* | 10/2013 | Calciu | G06F 9/526 718/102 |
| 2013/0311724 | A1* | 11/2013 | Walker | G06F 12/0811 711/136 |
| 2014/0040518 | A1* | 2/2014 | Udipi | G06F 13/1605 710/117 |
| 2016/0117342 | A1* | 4/2016 | Colgate | G06F 16/1734 707/694 |
| 2017/0109364 | A1* | 4/2017 | Hasegawa | G06F 16/1748 |
| 2019/0317846 | A1* | 10/2019 | Liu | G06F 9/547 |

* cited by examiner

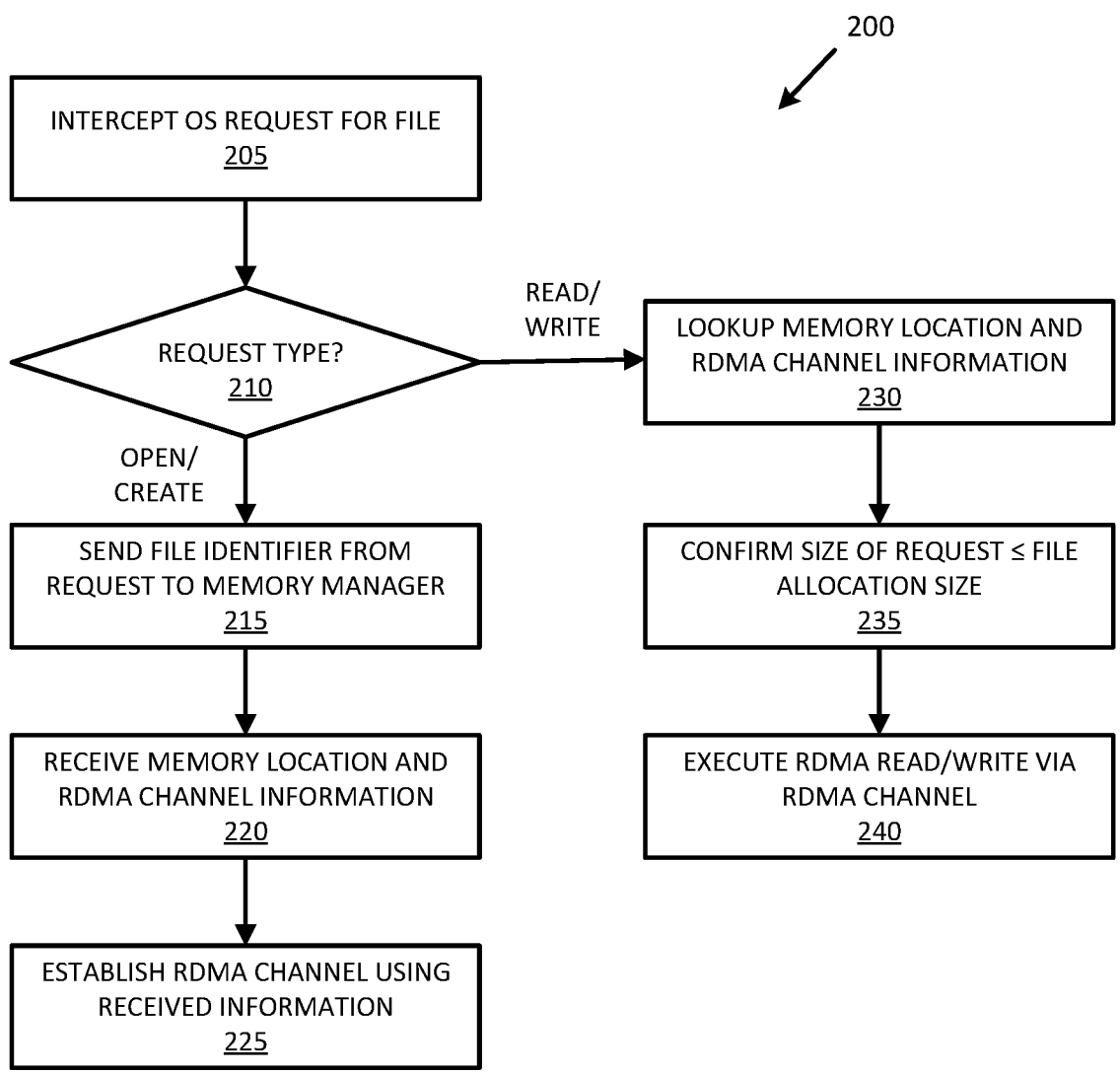

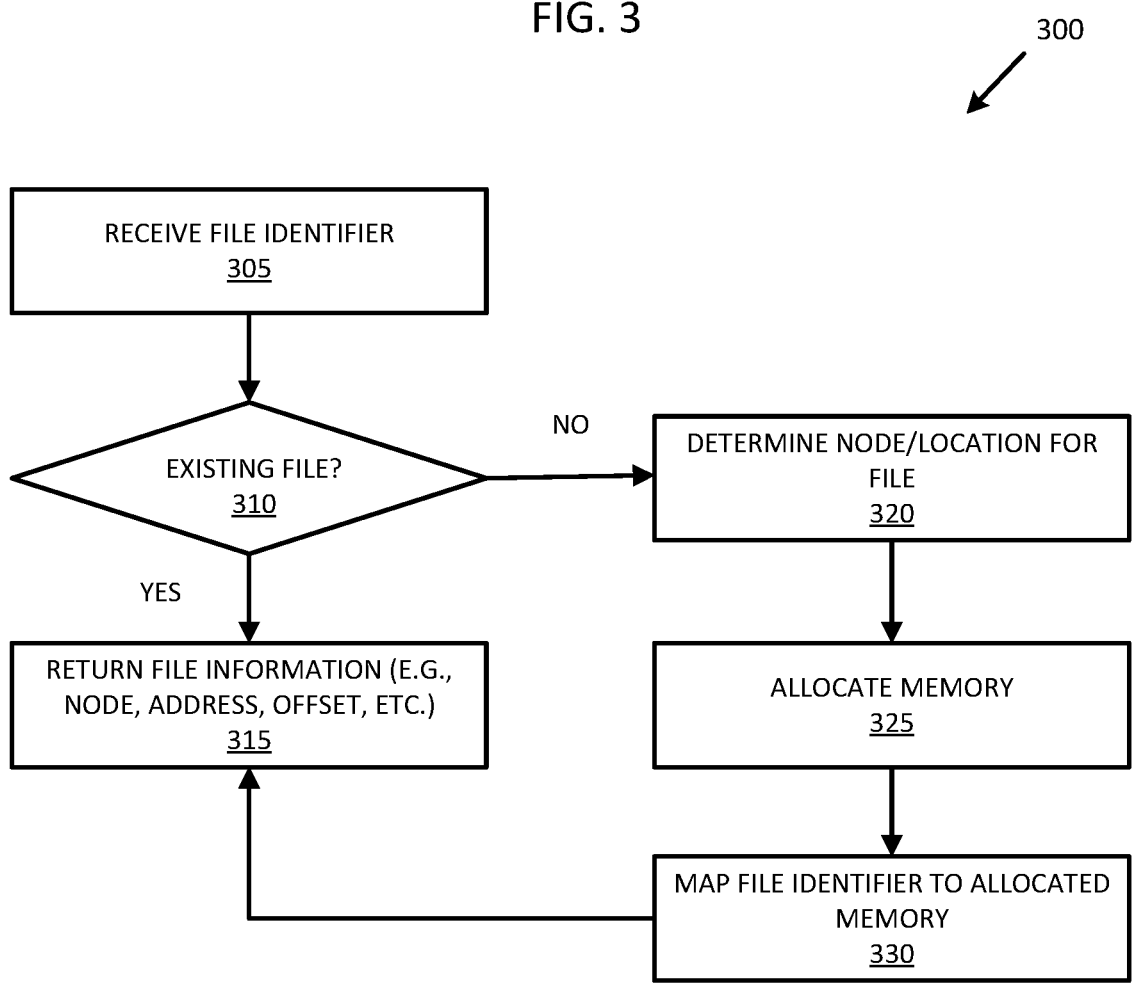

FILE SYSTEM INTERFACE FOR REMOTE DIRECT MEMORY ACCESS

FIELD OF THE INVENTION

The various embodiments described in this document relate to sharing temporary data across computers in a data center. In particular, embodiments provide a file system interface for sharing temporary data via direct access to the memory of another computer.

BACKGROUND OF THE INVENTION

Sharing temporary information across computers in a data center introduces a bottleneck in distributed workflows. For example, an application on one computer may produce temporary data consumed by an application on another computer within, e.g., a cluster of computers in a data center. The computer producing the temporary data waits until all the temporary data is transferred to the consumer computer, or at least in a buffer which will be transferred to the consumer computer, before continuing. The consumer computer waits for the data to be in a state which it can consume. This type of sharing of temporary information can be achieved using shared file systems or specialized protocols. Shared file systems, however, introduce undesirable overhead and specialized protocols are complex to program and often preclude the use of applications developed prior to or without implementation of the protocols. For example, Hadoop Distributed File System (HDFS) is a common mechanism used to transfer temporary state in a distributed system. HDFS, however, suffers from significant overhead to ensure fault-tolerance and high-availability. Other systems may provide a memory interface over remote direct memory access (RDMA). That, however, requires rewriting the software that expects to export data to temporary files to be compliant with an RDMA protocol.

BRIEF DESCRIPTION OF THE DRAWINGS

The present invention is illustrated by way of example and not limitation in the figures of the accompanying drawings, in which like references indicate similar elements, and in which:

FIG. 2 is a flow chart illustrating an exemplary method of a node providing a file system interface for sharing temporary data via remote direct memory access; and FIG. 3 is a flow chart illustrating an exemplary method of a remote memory manager providing a file system interface for sharing temporary data via remote direct memory access.

DETAILED DESCRIPTION

Figure 1:
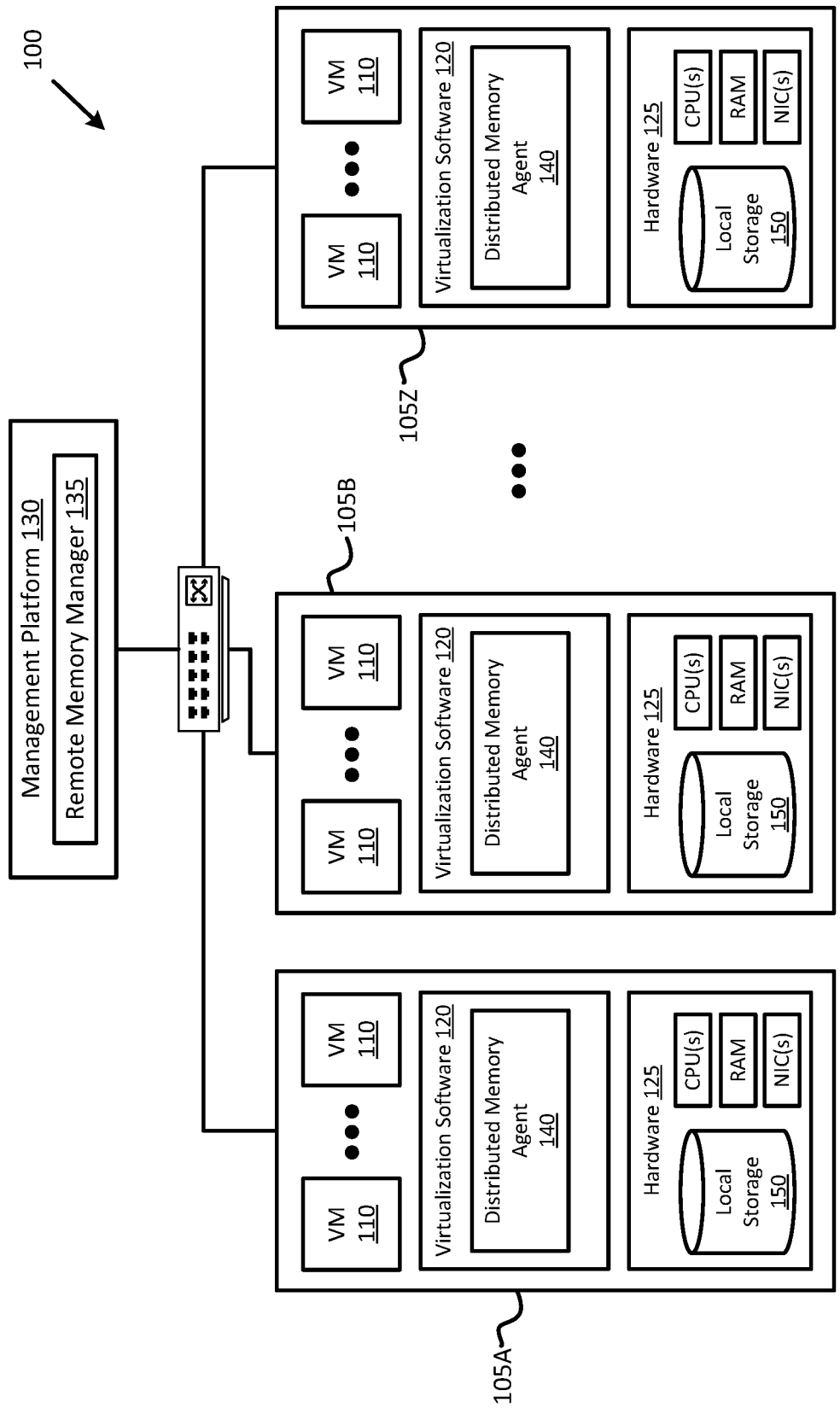
FIG. 1 illustrates, in block diagram form, an exemplary complex computing environment including one or more networked nodes configured to provide a file system interface for sharing temporary data via remote direct memory access.

This document describes embodiments that provide a file system interface for sharing temporary data via remote direct memory access. For example, a distributed memory agent within a first node intercepts an operating system request to open a file from an application running on the first node. Using a file identifier from the request, the distributed memory agent obtains a memory location within a second node for the file identifier and information to establish a remote direct memory access (RDMA) channel between the first node and the second node. In response to the operating system request to open the file, the distributed memory agent establishes the RDMA channel between the first node and the second node. Using the RDMA channel, the first node can read directly from or write directly to the memory location within the second node while bypassing an operating system of the second node. For example, the distributed memory agent translates operating system read and write requests into RDMA read and write requests. As a result, applications benefit from low latency RDMA without the applications needing to comply with the complications of allocating memory, setting up channels, or making special calls according to a RDMA protocol. Additionally, the file system interface avoids the overhead of fault-tolerance and high-availability common to other file systems.

FIG. 1 illustrates, in block diagram form, an exemplary complex computing environment 100 including one or more networked nodes 105 configured to provide a file system interface for sharing temporary data via remote direct memory access. This document may also refer to nodes 105 as processing devices, computers, hosts, and/or servers. While illustrated as nodes 105A-Z, computing environment may include fewer or more nodes 105 than depicted in FIG. 1. Nodes 105 are coupled to management platform 130 and one another via one or more switches.

In one embodiment, server-based computing in computing environment 100 provides centrally-managed user virtual desktops, such as those implemented by virtual machines (VMs) 110, via one or more networks (e.g., a local area network or other private or publicly accessible wide area network, such as the Internet). In one embodiment, one or more VMs 110 implement a virtualized compute, networking, storage, or security service (e.g., a firewall, webserver, database server, etc.).

Hardware 125 includes one or more processors ("CPU(s)"), local storage 150 and memory (e.g., "RAM"), and network interface controllers ("NIC(s)"). One or more of NIC(s) within each node 105 is an RDMA-capable interface. Local storage 150 and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic storage devices, optical storage devices, etc. The memory may be internal or distributed memory. Local storage 150 is housed in or otherwise directly attached to the nodes 105 and may include combinations of solid-state drives (SSDs) and/or magnetic or spinning disks (MDs). As used in this document, the term "housed" or "housed in" may be used to encompass both housed in or otherwise directly attached storage. In some embodiments, SSDs serve as a read cache and/or write buffer in front of magnetic disks to increase I/O performance.

One or more buses may be used to interconnect the various components of hardware 125. Additionally, the network interface controllers may be used to connect nodes 105, via a wired or wireless network, with one another.

Virtualization software 120 runs on hardware 125 of host server or node (e.g., a physical computer) 105. Virtualization software 120 manages VMs 110 and physical resources, such as hardware 125. Additionally, virtualization software 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105.

Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130. In one embodiment, management platform 130 includes CPU(s), RAM, and NIC(s) similar to hardware 125 described with reference to nodes 105. In an alternate embodiment, management platform 130 runs within a node, e.g., within a VM 110.

Management platform 130 includes remote memory manager 135. In an alternate embodiment, remote memory manager 135 runs independently of management platform 130, e.g., within a VM 110 or otherwise in a node 105. Remote memory manager 135 handles control operations for distributed memory for nodes 105. For example, remote memory manager 135 handles creating, opening, mapping, closing, allocating, deleting, etc. files or other portions of memory. Additionally, remote memory manager 135 tracks nodes 105 in the distributed memory system, file system metadata (e.g., inodes and directory contents), memory usage for each node 105, allocation of memory, allocation of virtual addresses, and list of open regions of memory. In one embodiment, remote memory manager 135 is not involved in reading and writing data in regions. Instead, remote memory manager 135 enables nodes 105 to handle these performance-critical operations.

Each node 105 includes distributed memory agent 140. Distributed memory agent 140 intercepts and processes operating system file requests. For example, the requests may be compliant with Portable Operating System Interface (POSIX) or another operating system or file system. The applications issuing these file requests may be unaware of or otherwise not programmed to utilize the underlying RDMA functionality and the requests are not compliant with an RDMA protocol. Distributed memory agent 140 coordinates with remote memory manager 135 to allocate local memory and to execute application file requests using RDMA. Distributed memory agent 140 tracks memory opened by applications running on the same node 105, memory addresses for the open regions of memory, and maps file identifiers to the open regions of memory. In one embodiment, the mapping includes an identifier of an RDMA channel for reading and writing to the open region of memory.

This document further describes the functionality of remote memory manager 135 and distributed memory agent 140 allocates local memory with reference to FIGS. 2-3.

FIG. 2 is a flow chart illustrating exemplary method 200 of a node providing a file system interface for sharing temporary data via RDMA. At block 205, distributed memory agent 140 intercepts or otherwise receives an operating system file request or command to otherwise manage the hierarchical structure of the file system (e.g., open a directory, read a directory, etc.). For example, the request may be a request to open, read, or write a temporary file in memory. Additionally, the request may be compliant with POSIX, Network File System (NFS), or another non-RDMA protocol or standard. The request includes a file identifier. For example, the file identifier may be a file name, file path, file descriptor, or another identifier.

At block 210, distributed memory agent 140 determines the request type. If the request is to open or create a file, at block 215, distributed memory agent 140 sends the file identifier to remote memory manager 135 to determine if the request is directed to an existing file or to allocate and associate memory with the file.

At block 220, distributed memory agent 140 receives a response from remote memory manager 135. In one embodiment, the response includes a memory location for the file and information to establish an RDMA channel with the node 105 storing the file. For example, the response may include an identifier of the node 105, a network address of an RDMA-enabled NIC for the node 105, a virtual address for the file, size of the file, and/or an address offset for the file. Distributed memory agent 140 stores a mapping of the file identifier to at least some of the received information in order to translate subsequent read and write requests directed to the file into RDMA read and write requests.

At block 225, distributed memory agent 140 establishes an RDMA channel with the other node 105 using the received information. In one embodiment, establishing the RDMA channel includes creating one or more queues in local memory. For example, the queues may include a send queue, a receive queue, and a completion queue. The send and receive queues are a queue pair and receive instructions as to files or buffers to send or receive. The completion queue facilitates notifications of the completion of instructions. Similarly, one or more queues are created by the other node 105. In one embodiment, establishing the RDMA channel includes distributed memory agent 140 requesting confirmation from the other node 105 that the memory location within the second node is valid.

If the request is a read or write request, at block 230, distributed memory agent 140 looks up the stored mapping between a file identifier in the request the memory location and RDMA channel information.

At block 235, distributed memory agent 140 performs a balance check to determine that the size of the read or write request does not exceed the allocated file size/boundary. If the read or write request does exceeds the allocated file size/boundary, distributed memory agent 140 may generate an error message and the read or write request fails.

At block 240, distributed memory agent 140 executes the read or write request via the RDMA channel. For example, distributed memory agent 140 translates the operating system read or write request into an RDMA read or write request using the memory location and RDMA channel information received from remote memory manager 135 when the file was opened or created. Distributed memory agent 140 issues an RDMA request to the remote RDMA NIC via the RDMA channel. For a read request, the remote RDMA NIC fulfills the request by writing the contents of the file to the memory of the distributed memory agent's buffer without involving the remote memory agent 140. For a write request, emote RDMA NIC fulfills the request by writing the contents of the file to the remote memory and responds to indicate if/when the write is successful. In one embodiment, a file may spawn multiple agents 140 and, as a result, each agent 140 will issue a separate RDMA request as needed.

FIG. 3 is a flow chart illustrating exemplary method 300 of remote memory manager 135 providing a file system interface for sharing temporary data via remote direct memory access. At block 305, remote memory manager 135 receives a file identifier from a distributed memory agent 140. For example, distributed memory agent 140 transmits a file identifier to open or create a file as described with reference to block 215 of FIG. 2.

At block 310, remote memory manager 135 determines if the file identifier maps to an existing file. For example, remote memory manager 135 maintains a data structure mapping file identifiers to allocated memory and performs a lookup or search of the data structure.

If the file identifier is associated with an existing file or otherwise is mapped to allocated memory, at block 315, remote memory manager 135 responds to the distributed memory agent 140 by returning file and RDMA information to enable distributed memory agent 140 to establish an RDMA channel and execute RDMA read and write requests on the file.

If the file identifier is not associated with an existing file or otherwise mapped to allocated memory, at block 320, remote memory manager 135 determines a node 105 and location for the file. In one embodiment, the file indicator indicates the node 105 to provide the memory for the file. For example, the file path or file name may include a node name, number, or other indication of which node 105 hosts the memory. Alternatively, remote memory manager 135 determines the node 105 based upon available memory among nodes 105, affinity rules (e.g., based upon the application consuming or producing the temporary data), via round robin, or via another load balancing scheme.

At block 325, remote memory manager 135 allocates memory for the file. For example, remote memory manager 135 sends a message to the RDMA NIC of the determined node 105 indicating an address, offset, size, etc. of memory that is to be allocated. Additionally, remote memory manager 135 updates its data structure for tracking how much and which memory is consumed by each node based upon the allocation.

At block 330, remote memory manager 135 maps the file identifier to the allocated memory. For example, remote memory manager 135 stores a mapping between the file identifier and the determined node 105 and an address, offset, size, etc. of memory that was allocated.

Once the file has been created, remote memory manager 135 returns file and RDMA information as described above with reference to block 315.

It will be apparent from this description that aspects of the inventions may be embodied, at least in part, in software. That is, a computer system or other data processing system, such as nodes 105 using RDMA NICs, may carry out the computer-implemented methods 200 and 300 in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in some embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   intercepting a first operating system request to open a file from an application running on a first node, the request including a file identifier;
   transmitting the file identifier to a remote memory manager;
   receiving, from the remote memory manager in response to the file identifier, a memory location within a second node for the file identifier and information to establish a remote direct memory access channel between the first node and the second node;
   in response to the first operating system request to open the file, establishing the remote direct memory access channel between the first node and the second node, wherein the remote direct memory access channel allows the first node to read directly from or write directly to the memory location within the second node while bypassing an operating system of the second node;
   storing, within the first node, a mapping of the file identifier to the second node memory location and the remote direct memory access channel;
   intercepting a second operating system request to read or write the file from the application running on the first node, the request to read or write the file including the file identifier;
   accessing the stored mapping of the file identifier to the remote direct memory access channel; and
   executing the request to read or write the file using the remote direct memory access channel.

2. The computer-implemented method of claim 1, wherein establishing the remote direct memory access channel between the first node and the second node includes creating a queue within the first node for passing read and write requests to the second node and storing an identifier of a network interface on the second node.

3. The computer-implemented method of claim 1, further comprising:
   requesting confirmation from the second node that the memory location within the second node is valid.

4. The computer-implemented method of claim 1, wherein the remote memory manager allocates memory within the second node for the memory location in response to determining the file identifier does not map to an existing file.

5. The computer-implemented method of claim 1, wherein the remote memory manager sends the memory location and information to establish the remote direct memory access channel in response to determining the file identifier maps to an existing file.

6. A non-transitory computer-readable medium storing instructions, which when executed by a processing device, cause the processing device to perform a method comprising:
   intercepting a first operating system request to open a file from an application running on a first node, the request including a file identifier;
   transmitting the file identifier to a remote memory manager;
   receiving, from the remote memory manager in response to the file identifier, a memory location within a second node for the file identifier and information to establish a remote direct memory access channel between the first node and the second node;
   in response to the first operating system request to open the file, establishing the remote direct memory access channel between the first node and the second node, wherein the remote direct memory access channel allows the first node to read directly from or write directly to the memory location within the second node while bypassing an operating system of the second node;
   storing, within the first node, a mapping of the file identifier to the second node memory location and the remote direct memory access channel;
   intercepting a second operating system request to read or write the file from the application running on the first node, the request to read or write the file including the file identifier;
   accessing the stored mapping of the file identifier to the remote direct memory access channel; and
   executing the request to read or write the file using the remote direct memory access channel.

7. The non-transitory computer-readable medium of claim 6, wherein establishing the remote direct memory access channel between the first node and the second node includes creating a queue within the first node for passing read and write requests to the second node and storing an identifier of a network interface on the second node.

8. The non-transitory computer-readable medium of claim 6, the method further comprising:
   requesting confirmation from the second node that the memory location within the second node is valid.

9. The non-transitory computer-readable medium of claim 6, wherein the remote memory manager allocates memory within the second node for the memory location in response to determining the file identifier does not map to an existing file.

10. The non-transitory computer-readable medium of claim 6, wherein the remote memory manager sends the memory location and information to establish the remote direct memory access channel in response to determining the file identifier maps to an existing file.

11. A first node comprising:
    a processing device; and
    a memory coupled to the processing device, the memory storing instructions which, when executed by the processing device, cause the first node to:
    intercept a first operating system request to open a file from an application running on the first node, the request including a file identifier;
    transmit the file identifier to a remote memory manager;

receive, from the remote memory manager in response to the file identifier, a memory location within a second node for the file identifier and information to establish a remote direct memory access channel between the first node and the second node;

in response to the first operating system request to open the file, establish the remote direct memory access channel between the first node and the second node, wherein the remote direct memory access channel allows the first node to read directly from or write directly to the memory location within the second node while bypassing an operating system of the second node;

storing, within the first node, a mapping of the file identifier to the second node memory location and the remote direct memory access channel;

intercepting a second operating system request to read or write the file from the application running on the first node, the request to read or write the file including the file identifier;

accessing the stored mapping of the file identifier to the remote direct memory access channel; and executing the request to read or write the file using the remote direct memory access channel.

12. The first node of claim 11, wherein establishing the remote direct memory access channel between the first node and the second node includes creating a queue within the first node for passing read and write requests to the second node and storing an identifier of a network interface on the second node.

13. The first node of claim 11, wherein the instructions further cause the first node to:

request confirmation from the second node that the memory location within the second node is valid.

14. The first node of claim 11, wherein the remote memory manager allocates memory within the second node for the memory location in response to determining the file identifier does not map to an existing file.

\* \* \* \* \*